(12) United States Patent
't Zand et al.

(10) Patent No.: US 8,357,421 B2
(45) Date of Patent: Jan. 22, 2013

(54) COMPOSITION COMPRISING TRIGLYCERIDES

(75) Inventors: Imro 't Zand, Wormerveer (NL); Hendrikus Slager, Wormerveer (NL)

(73) Assignee: Loders Croklaan B.V., Wormerveer (NL)

(*) Notice: Subject to any disclaimer, the term of this patent is extended or adjusted under 35 U.S.C. 154(b) by 276 days.

(21) Appl. No.: 12/666,714

(22) PCT Filed: Jul. 9, 2008

(86) PCT No.: PCT/EP2008/005601
§ 371 (c)(1),
(2), (4) Date: Apr. 29, 2010

(87) PCT Pub. No.: WO2009/007105
PCT Pub. Date: Jan. 15, 2009

(65) Prior Publication Data
US 2010/0215809 A1    Aug. 26, 2010

(30) Foreign Application Priority Data

Jul. 11, 2007  (EP) .................................... 07252777

(51) Int. Cl.
*A23D 9/00* (2006.01)
(52) U.S. Cl. ........................................ 426/607; 426/606
(58) Field of Classification Search ................. 426/607
See application file for complete search history.

(56) References Cited

U.S. PATENT DOCUMENTS

| | | | |
|---|---|---|---|
| 5,288,513 A | 2/1994 | Cain et al. | |
| 5,405,639 A | 4/1995 | Pierce et al. | |
| 5,424,090 A | 6/1995 | Okawauchi et al. | |
| 5,654,018 A | 8/1997 | Cain et al. | |
| 5,849,940 A | 12/1998 | Harris et al. | |
| 5,858,427 A | 1/1999 | Cain et al. | |
| 5,879,736 A * | 3/1999 | Fujinaka et al. | 426/607 |
| 5,928,704 A | 7/1999 | Takeda et al. | |
| 5,939,114 A | 8/1999 | Cain et al. | |
| 6,258,398 B1 | 7/2001 | Okada et al. | |
| 7,611,744 B2 * | 11/2009 | Cain et al. | 426/606 |
| 7,794,773 B2 * | 9/2010 | Cain et al. | 426/606 |
| 7,927,647 B2 * | 4/2011 | Andou et al. | 426/606 |
| 2003/0235642 A1 | 12/2003 | Huxel | |
| 2006/0051485 A1 | 3/2006 | Buttini et al. | |
| 2006/0105090 A1 | 5/2006 | Cain et al. | |
| 2006/0172057 A1 | 8/2006 | Cleenewerck | |
| 2010/0215810 A1 | 8/2010 | Zand et al. | |

FOREIGN PATENT DOCUMENTS

| | | |
|---|---|---|
| EP | 0536824 A1 | 4/1993 |
| EP | 0688505 A1 | 12/1995 |
| EP | 0803196 A1 | 10/1997 |
| EP | 0815738 A1 | 1/1998 |
| EP | 1491097 A1 | 12/2004 |
| JP | 5211837 A | 8/1993 |
| JP | 9285255 A | 11/1997 |
| JP | 11169191 A | 6/1999 |
| JP | 2007319043 A | 12/2007 |
| WO | WO 97/02754 | 1/1997 |
| WO | WO 2005/094598 A1 | 10/2005 |
| WO | WO 2009/007101 A1 | 1/2009 |

OTHER PUBLICATIONS

International Search Report for PCT/EP2008/005601, date of mailing Oct. 31, 2008.
Written Opinion of the International Searching Authority for PCT/EP2008/005601, date of mailing Oct. 31, 2008.
International Preliminary Report on Patentability, for PCT/EP2008/005601, date of mailing Jan. 21, 2010.
International Preliminary Report on Patentability for PCT/EP2008/005601, date of mailing Jan. 12, 2010.
International Search Report for PCT/EP2008/005595, date of mailing Oct. 29, 2008.
Written Opinion of the International Searching Authority for PCT/EP2008/005595, date of mailing Oct. 29, 2008.
International Preliminary Report on Patentability for PCT/EP2008/005595, date of mailing Jan. 21, 2010.
Norizzah, A. R., et al., "Effects of Chemical Interesterification on Physiochemical Properties of Palm Stearin and Palm Kernel Olein Blends," *Food Chemistry*, 86: 229-235 (2004).
Office Action for U.S. Appl. No. 12/666,717, Date of mailing Jun. 19, 2012.
Notice of Allowance, U.S. Appl. No. 12/666,717, Dated: Oct. 2, 2012.

\* cited by examiner

*Primary Examiner* — Carolyn Paden
(74) *Attorney, Agent, or Firm* — Hamilton, Brook, Smith & Reynolds, P.C.

(57) ABSTRACT

A composition comprising triglycerides may be used as a coating fat. The triglyceride content of the composition comprises: SSS in an amount of from 10 to 20%; SUS in an amount of from 45 to 65%; SSU in an amount of from 10 to 18%; SU2 in an amount of less than 15%; and S2U in an amount of greater than 70%; wherein: the weight ratio of SUS:SSU is from 3:1 to 6:1; S is a saturated fatty acid residue having from 12 to 24 carbon atoms; U is an unsaturated fatty acid residue having from 12 to 24 carbon atoms; and all percentages are by weight based on the total triglycerides present in the composition.

37 Claims, No Drawings

US 8,357,421 B2

COMPOSITION COMPRISING TRIGLYCERIDES

CROSS REFERENCE TO RELATED APPLICATIONS

This application is the U.S. National Stage of International Application No. PCT/EP2008/005601, filed Jul. 9, 2008, which designates the U.S., published in English, and claims priority under 35 U.S.C. §§119 or 365(c) to European Application No, 07252777.3, filed Jul. 11, 2007.

This invention relates to a composition comprising triglycerides, to a process for producing the composition and to the use of the composition as a coating fat.

Bakery products such as donuts, cakes, cookies, biscuits and pastries are often coated with a layer of chocolate. The coating can be partial or complete. Although the coating can be of chocolate, it is sometimes preferable to use a chocolate-like composition that contains triglycerides.

Triglyceride fats are often characterized in terms of their fatty acid content. The term fatty acid generally refers to straight chain carboxylic acids having from 12 to 24 carbon atoms and is used herein to refer to the carboxylic acid residues bound to the glycerol moiety in the triglyceride, and not to free carboxylic acid. Typically, the abbreviation S is used to denote a saturated fatty acid residue having 12 to 24 carbon atoms and U denotes an unsaturated fatty acid residue having 12 to 24 carbon atoms. Thus, for example, a pure triglyceride containing three saturated fatty acid residues is denoted SSS (having the same meaning as S3 or $S_3$) and a triglyceride having saturated fatty acids at the 1 and 3 positions and an unsaturated fatty acid at the 2-position is denoted SUS. S2U (or its equivalent term $S_2U$) refers to combined SSU and SUS, and SU2 (or $SU_2$) refers to combined SUU and USU. U3 (or $U_3$) refers to UUU.

Triglyceride fats have been proposed for a number of food applications.

U.S. Pat. No. 5,939,114 discloses coatings for ice creams. The coatings contain triglycerides having less than 10% of SSS.

U.S. Pat. No. 5,879,736 describes additive fats for inhibiting fat blooming or graining of hard butter compositions. These fats have a relatively low ratio of SUS to SSU triglycerides.

EP-A-0536824 relates to non-temper confectionery fats. The fats have a relatively high SUS content and a low SSS content. The fats have a ratio of SSO:SOO of at least 3.

SUMMARY OF THE INVENTION

There remains a need for triglyceride fat compositions, particularly those that are suitable for use as coatings on products that are sold and/or consumed at ambient temperature (i.e., 5 to 30° C.). There is a continuing need for compositions that can be produced economically and that have good organoleptic properties when used as coatings, such as on bakery or confectionery products.

According to the present invention, there is provided a composition comprising triglycerides, wherein the triglyceride content of the composition comprises:
SSS in an amount of from 10 to 20%;
SUS in an amount of from 45 to 65%;
SSU in an amount of from 10 to 18%;
SU2 in an amount of less than 15%; and
S2U in an amount of greater than 70%;
wherein:
the weight ratio of SUS:SSU is from 3:1 to 6:1;
S is a saturated fatty acid residue having from 12 to 24 carbon atoms;
U is an unsaturated fatty acid residue having from 12 to 24 carbon atoms;
and all percentages are by weight based on the total triglycerides present in the composition.

DETAILED DESCRIPTION OF THE INVENTION

It will be understood that S and U may be single fatty acid residues (e.g., all C16 or all C18) or, more typically, mixtures of different fatty acid residues (e.g., mixtures of C16, C18 and others). The term fatty acid, as used herein, refers to saturated and/or unsaturated (including mono-, di- and poly-unsaturated) straight chain carboxylic acids having from 12 to 24 carbon atoms.

In another aspect, the invention provides a process for producing a composition of the invention, which comprises the interesterification of palm oil stearin which is not further fractionated.

In a further aspect, the invention provides a coated product, wherein the coating comprises a composition of the invention.

In another aspect, the invention provides the use of a composition of the invention as a coating fat.

The present invention is based on the finding of triglyceride compositions that are useful as coating fats. The compositions can be produced economically and have a low or very low content of trans fatty acids. The coatings have good organoleptic properties.

The physical properties of fats are sometimes defined in terms of N values. These indicate the percentage of solid fat in the composition at a given temperature. Preferably, the composition of the invention has an N20 of greater than 40, more preferably greater than 55, even more preferably greater than 60. These N values are based on unstabilised fats. Thus, the term Nx refers to solid fat content at a temperature of x° C., measured by NMR pulse techniques on unstabilized fats. Unstabilized meaning that the fat was melted at 80° C., kept at 60° C. for 5 minutes, cooled to 0° C., kept at 0° C. for 1 hour and kept at measurement temperature for 30 minutes.

Preferably, the triglycerides that are used in the compositions of the invention are vegetable fats. By this, it is meant that the triglycerides are principally or wholly derived from fats from vegetable sources, either directly or indirectly, rather than being derived from animals. Typically, the compositions of the invention will comprise at least 50% by weight of triglycerides derived from vegetable sources, more preferably at least 60% by weight, such as at least 70%, at least 80%, at least 90%, at least 95% or even 100% by weight. More preferably, the triglycerides present in the compositions of the invention are derived from palm oil or a fraction thereof.

Compositions of the invention preferably comprise triglycerides having less than 3% by weight of fatty acid residues having from 20 to 24 carbon atoms, based on the total weight of fatty acid residues in the triglycerides. The triglycerides are preferably substantially free of fatty acid residues having 22 carbon atoms i.e., they comprise these fatty acid residues in an amount of less than 1%, more preferably less than 0.5%, even more preferably less than 0.1% by weight based on the total fatty acid content of the triglycerides.

Preferably, compositions of the invention comprise U3 triglycerides in an amount of less than 4% by weight of the triglycerides, even more preferably less than 3% by weight, such as less than 2.5% or less than 2% by weight.

The triglycerides in the compositions of the invention preferably comprise SSS in an amount of from 11 to 18% by weight of the triglycerides, more preferably from 11 to 15%.

The compositions preferably comprise triglycerides that contain SUS in an amount of from 55 to 65% by weight, more preferably from 58 to 62% by weight of the triglycerides.

Preferably, the SSU content of the triglycerides is from 11 to 16%, more preferably from 11 to 15% by weight of the triglycerides.

The triglycerides preferably comprise SU2 in an amount of from 2 to 14%, more preferably from 10 to 14%, by weight of the triglycerides.

The triglycerides in the compositions of the invention preferably have a relative content of SUS and SSU such that the weight ratio of SUS:SSU is from 4:1 to 5:1.

Preferably, the triglycerides in the compositions of the invention have a weight ratio of SSO:SOO of less than 3, more preferably less than 2.5 or less than 2.

Compositions of the invention preferably contain triglycerides that comprise S2U in an amount of from 71 to 80% by weight, more preferably from 72 to 78% by weight.

Further triglycerides, such as from other sources, may optionally be included in compositions of the invention, for example, by mixing or blending. For example, the triglycerides in the composition may comprise added PStP in an amount of up to 10% by weight, such as from 1 to 5% by weight, based on the weight of the triglycerides. PStP is preferably obtained from fully hardened palm oil or a fraction thereof such as fully hardened palm oil mid-fraction.

In the compositions and the triglycerides of the invention, the percentage values of the various components, together with other optional components not explicitly stated, if present, will total 100%.

Compositions of the invention may be produced by conventional processes, for example involving fractionation and/or blending of triglyceride fats or oils. Preferably, the compositions are produced by a process which comprises the interesterification of palm oil or a palm oil fraction. More preferably, the process comprises the interesterification of palm oil stearin which is not further fractionated. In a particularly preferred process, a palm oil fraction is interesterified, such as a palm oil stearin, more preferably having an iodine value (IV) of from 20 to 50. The interesterified product is then blended with one or more further triglycerides, such as a further palm oil fraction, for example a (non-interesterified) palm oil mid-fraction. Additional triglycerides, such as PStP, are also optionally blended into the product.

Interesterification can be carried out chemically or enzymatically. Fractionation may be carried out in the presence of a solvent but is preferably carried out dry i.e., in the absence of a solvent.

Triglycerides used in the compositions of the invention are preferably substantially free of trans fatty acid residues. The compositions preferably comprise trans fatty acid residues in an amount of less than 1% by weight of the fatty acids present in the triglyceride, more preferably less than 0.5% by weight, even more preferably less than 0.1% by weight.

The compositions of the invention may comprise mono- and/or di-glycerides but these will typically be present in smaller quantities than the triglycerides. For example, preferably less than 20% by weight, more preferably less than 10% by weight, even more preferably less than 5% by weight, such as less than 3% or less than 1% by weight of the total glycerides are mono- or di-glycerides.

Compositions of the invention may comprise, in addition to the triglycerides, at least one ingredient selected from the group consisting of cocoa-derived materials and sugars. The cocoa-derived materials are preferably selected from the group consisting of cocoa powder, cocoa mass and cocoa solids. Other cocoa-derived materials include chocolate flavours and colours. Sugars include sucrose, fructose and glucose. Sucrose is preferred. Other optional components of the compositions include dairy powders, such as skimmed milk powder, salt and emulsifiers such as lecithin.

Compositions of the invention include fats that are sold for further processing by mixing with other ingredients before being used in food products, i.e., relatively pure fats, as well as the compositions that are formulated with other components (such as cocoa solids and sugar) and used in the food products, such as coatings.

In one embodiment, compositions of the invention will typically comprise, by weight of the composition, greater than 50% by weight triglycerides, such as greater than 60% by weight triglycerides, more preferably greater than 70% by weight triglycerides, even more preferably greater than 80% by weight triglycerides, for example greater than 90% or greater than 95% by weight triglycerides. These compositions will generally be marketed and sold as fat compositions for use in applications such as coatings.

In another embodiment, compositions of the invention contain at least 25% by weight of a fat phase, typically together with one or more other ingredients. The balance of the compositions can be made up of a gaseous phase, an aqueous phase, a solid phase, or mixtures thereof. Preferably, the fat phase comprises at least 70% by weight of triglycerides, more preferably 80 to 95% by weight of the triglycerides. These compositions may be used directly as coating fats.

Compositions of the invention are preferably suitable for use as coating fats. For example, the coating may be applied to a confectionery or bakery product. It is preferred that the compositions are used as coatings on products that are sold and/or consumed at ambient temperature (i.e., from 5 to 30° C.).

Compositions of the invention are edible and may be suitable as replacements for chocolate in a number of applications. The compositions may replace all of the chocolate, or just a part of the chocolate (i.e., the composition may be mixed with chocolate) in any given application. The compositions are particularly suitable as replacements for chocolate when used as a coating.

The compositions of the invention may be suitable as a replacement for chocolate, for example in coatings, such as coatings for bakery products. The chocolate composition may, for example, have the colour and/or flavour of plain chocolate, white chocolate or milk chocolate.

The composition of the invention can be used to coat bakery products. The term "bakery products", as used herein, refers to products that are typically produced or sold in a bakery and which have preferably been baked or fried, although they can be produced in other ways. The coating can be partial or complete and, when the coating is complete, the composition will encapsulate the bakery product. The bakery products are preferably made using flour. Examples of bakery products are donuts, cakes, biscuits, pastries and cookies. Donuts optionally contain jam or jelly.

Coated bakery products can be produced by heating the composition to around or above the melting point of the composition (e.g., above 35° C.), applying the composition to an uncoated bakery product (e.g., by pouring the composition onto the uncoated bakery product or by immersing the uncoated bakery product in the composition) and lowering the temperature to below the melting point of the composition by allowing to cool (or by forced cooling). Suitable methods are well-known to those skilled in the art.

The coated bakery products may be further decorated with ingredients that adhere to the coating of the composition such as icing and/or chocolate strands or chips or sugar strands (which can be of a single colour or multi-coloured).

Coatings made using the composition may have good gloss and/or bloom resistance. The compositions may have the further advantage of easier processing to form coatings, for example improved viscosity for enrobing. Further advantages include better heat resistance, improved demoulding properties and improved eating qualities.

Confectionery products may also be coated with a composition of the invention. Suitable confectionery products include chocolates, chocolate-like products and jellies.

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

The following non-limiting examples illustrate the invention and do not limit its scope in any way. In the examples and throughout this specification, all percentages, parts and ratios are by weight unless indicated otherwise. Fatty acid (residue) contents are expressed by weight based on the weight of the total fatty acid residues in the triglycerides, calculated as free (i.e., hydrolysed) fatty acids. Triglyceride contents are expressed by weight based on the weight of total triglycerides present in the composition.

EXAMPLES

Example 1

A composition of the invention was obtained by blending 35% by weight of an interesterified palm oil stearin having an iodine value (IV) of 35 (inPOsIV35) with 65% by weight of a wet fractionated palm oil mid-fraction (POm). The composition comprised the following triglyceride components:

| inPOsIV35 | 35 |
| POm | 65 |

| HPLC-silverphase | Calc % |
| --- | --- |
| SSS | 12 |
| SOS | 55 |
| SSO | 11 |
| SLS | 5 |
| SSL | 2 |
| OSO | 2 |
| SOO | 7 |
| OSL | 3 |
| SOL | 0 |
| OOO | 1 |
| Others | 2 |

The composition had the following unstabilised (US) N values:

| US-N20 NMR | 77 |
| US-N25 NMR | 52.1 |
| US-N30 NMR | 28 |
| US-N35 NMR | 15.4 |
| US-N40 NMR | 9 |
| US-N45 NMR | 3.9 |

Example 2

Coatings are made from the composition of Examples using the refining-conche method. The coatings are prepared according to the following recipe:

| 11.5% | Cocoa mass |
| 10% | Cocoa powder DR 74 |
| 28% | 35% inPOsIV35/65% wfPOm |
| 3% | Skimmed mild powder |
| 47.5% | Sugar |
| | Additives: |
| 0.4% | Lecithin |
| 0.03% | Cream vanillin DU-00569 |

The solid ingredients of the recipe and the cocoa mass are mixed in a Hobart mixer at 50° C. with a part of the liquid fat to obtain a homogeneous mass. Next, this mass is refined using a three roll refiner to obtain powder with a particle size of about 20 microns. Then, the other part of the fat is put into the conche followed by the powder. The coating is conched at 50° C. for 4 hours, lecithin and vanillin are added after 3.5 hours.

Example 3

Chocolates were prepared by using the ball mill equipment. This is a standard equipment to prepare chocolate like coatings. Milling for 40 minutes fineness of the sugar particles was around 25-30 micron.

Recipe that was used:

| Fat | 32% |
| Sugar | 48% |
| Cocoa powder (non-alkalised) | 20% |
| Added: | |
| Lecithin | 0.4% |

Coatings were stored at 45-48° C. prior to evaluation. This equals the usual stocking of ready-made chocolates in factories prior to the start of the application/production of consumer products.

Chocolate bars were produced under comparable circumstances:

| Coating temperature | 45-48° C. |
| Chocolate moulds at | 20-22° C. |
| Cooling was done at | 15° C. under wind speed of around 3 m/sec. |

Fat blends evaluated were of the following composition:
A. 35% inPOs/65% iPOm (present invention)
B. 30% inPOsm/70% iPOm
C. 80% POm/20% POf
Results:
(i) Enrobing of inert centre (cork)
Coating temperature around 45-48° C.
Cooling at 15° C., wind speed 3 m/sec.

| | | |
|---|---|---|
| A. | 5 min cooling: | moderate |
| | 10 min | acceptable |
| B. | 5 min cooling: | very sticky |
| | 10 min | very sticky |
| C. | 5 min cooling | unacceptable |
| | 10 min | unacceptable |

(ii) Coatings were pre crystallized for moulding of bars, down to a temperature where moulding was still possible (judgment of viscosity by the eye)
Temperature of coating upon moulding:
A. 35-37° C.
B. 35-37° C.
C. 30-31° C.
Time needed for 20-30% demoulding (cooling as earlier mentioned):
A. 20 minutes
B. 30 minutes
C. >50 minutes

The invention claimed is:

1. A composition comprising triglycerides, wherein the triglyceride content of the composition comprises:
    SSS in an amount of from 10 to 20%;
    SUS in an amount of from 55 to 65%;
    SSU in an amount of from 10 to 18%;
    SU2 in an amount of less than 15%; and
    S2U in an amount of greater than 70%;
    wherein:
    the weight ratio of SUS:SSU is from 3:1 to 6:1;
    S is a saturated fatty acid residue having from 12 to 24 carbon atoms;
    U is an unsaturated fatty acid residue having from 12 to 24 carbon atoms;
    and all percentages are by weight based on the total triglycerides present in the composition.

2. A composition as claimed in claim 1, having an N20 of greater than 40.

3. A composition as claimed in claim 1, having an N20 of greater than 55.

4. A composition as claimed in claim 1, having an N20 of greater than 60.

5. A composition as claimed in claim 1, which is derived from palm oil or a fraction thereof.

6. A composition as claimed in claim 1, wherein the triglycerides comprise less than 3% by weight of fatty acid residues having from 20 to 24 carbon atoms, based on the weight of fatty acid residues in the triglycerides.

7. A composition as claimed in claim 1, additionally containing U3 in an amount of less than 4% by weight.

8. A composition as claimed in claim 1, additionally containing U3 in an amount of less than 3% by weight.

9. A composition as claimed in claim 1, wherein the triglycerides comprise SSS in an amount of from 11 to 18% by weight.

10. A composition as claimed claim 1, wherein the triglycerides comprise SUS in an amount of from 58 to 62% by weight.

11. A composition as claimed in claim 1, wherein the triglycerides comprise SU2 in an amount of from 2 to 14% by weight.

12. A composition as claimed in claim 1, wherein the weight ratio of SUS:SSU is from 4:1 to 5:1.

13. A composition as claimed in claim 1, wherein the triglycerides comprise S2U in an amount of from 71 to 80% by weight.

14. A composition as claimed in claim 1, additionally containing PStP in an amount of up to 10% by weight based on the weight of the triglycerides.

15. A composition as claimed in claim 14, additionally containing PStP in an amount of from 1 to 5% by weight based on the weight of the triglycerides.

16. A composition as claimed in claim 1, additionally containing one or more ingredients selected from cocoa-derived materials and sugars.

17. A composition as claimed in claim 1, which comprises interesterified palm oil stearin which is not further fractionated.

18. A coated product, wherein the coating comprises a composition of claim 1.

19. A coated product of claim 18 comprising a confectionery product or a bakery product.

20. A composition comprising triglycerides, wherein the triglyceride content of the composition comprises:
    SSS in an amount of from 10 to 20%;
    SUS in an amount of from 45 to 65%;
    SSU in an amount of from 10 to 18%;
    SU2 in an amount of less than 15%; and
    S2U in an amount of greater than 70%;
    wherein:
    the weight ratio of SUS:SSU is from 4:1 to 5:1;
    S is a saturated fatty acid residue having from 12 to 24 carbon atoms;
    U is an unsaturated fatty acid residue having from 12 to 24 carbon atoms;
    and all percentages are by weight based on the total triglycerides present in the composition.

21. A composition as claimed in claim 20, having an N20 of greater than 40.

22. A composition as claimed in claim 20, having an N20 of greater than 55.

23. A composition as claimed in claim 20, having an N20 of greater than 60.

24. A composition as claimed in claim 20, which is derived from palm oil or a fraction thereof.

25. A composition as claimed in claim 20, wherein the triglycerides comprise less than 3% by weight of fatty acid residues having from 20 to 24 carbon atoms, based on the weight of fatty acid residues in the triglycerides.

26. A composition as claimed in claim 20, additionally containing U3 in an amount of less than 4% by weight.

27. A composition as claimed in claim 20, additionally containing U3 in an amount of less than 3% by weight.

28. A composition as claimed in claim 20, wherein the triglycerides comprise SSS in an amount of from 11 to 18% by weight.

29. A composition as claimed claim 20, wherein the triglycerides comprise SUS in an amount of from 58 to 62% by weight.

30. A composition as claimed in claim 20, wherein the triglycerides comprise SU2 in an amount of from 2 to 14% by weight.

31. A composition as claimed in claim 20, wherein the triglycerides comprise S2U in an amount of from 71 to 80% by weight.

32. A composition as claimed in claim 20, additionally containing PStP in an amount of up to 10% by weight based on the weight of the triglycerides.

33. A composition as claimed in claim 32, comprising PStP in an amount of from 1 to 5% by weight based on the weight of the triglycerides.

34. A composition as claimed in claim 20, additionally containing one or more ingredients selected from cocoa-derived materials and sugars.

35. A composition as claimed in claim 20, which comprises interesterified palm oil stearin which is not further fractionated.

36. A coated product, wherein the coating comprises a composition of claim 20.

37. A coated product of claim 36 comprising a confectionery product or a bakery product.

* * * * *